United States Patent
Karacan et al.

(10) Patent No.: US 9,805,593 B2
(45) Date of Patent: *Oct. 31, 2017

(54) METHOD FOR COMMUNICATION WITHIN AN, IN PARTICULAR WIRELESS, MOTOR VEHICLE COMMUNICATION SYSTEM INTERACTING IN AN AD-HOC MANNER, DEVICE FOR THE TRAFFIC INFRASTRUCTURE AND ROAD USER DEVICE

(71) Applicant: SIEMENS AKTIENGESELLSCHAFT, München (DE)

(72) Inventors: Ömer Karacan, Vienna (AT); Fritz Kasslatter, Gablitz (AT)

(73) Assignee: Siemens Aktiengesellschaft, München (DE)

( * ) Notice: Subject to any disclaimer, the term of this patent is extended or adjusted under 35 U.S.C. 154(b) by 0 days.
This patent is subject to a terminal disclaimer.

(21) Appl. No.: 14/651,190

(22) PCT Filed: Nov. 15, 2013

(86) PCT No.: PCT/EP2013/073897
§ 371 (c)(1),
(2) Date: Jun. 10, 2015

(87) PCT Pub. No.: WO2014/090505
PCT Pub. Date: Jun. 19, 2014

(65) Prior Publication Data
US 2015/0310738 A1    Oct. 29, 2015

(30) Foreign Application Priority Data
Dec. 11, 2012    (DE) .................. 10 2012 222 780

(51) Int. Cl.
*G06F 19/00*    (2011.01)
*G06G 7/70*    (2006.01)
(Continued)

(52) U.S. Cl.
CPC ............ *G08G 1/0133* (2013.01); *G01S 19/13* (2013.01); *G08G 1/0112* (2013.01);
(Continued)

(58) Field of Classification Search
CPC . H04W 56/0005; H04W 84/18; H04W 40/14; H04W 4/02; H04W 12/08;
(Continued)

(56) References Cited

U.S. PATENT DOCUMENTS 5,821,878 A    10/1998    Raswant
6,791,471 B2 *    9/2004    Wehner ................. G01S 5/0072
340/438

(Continued)

FOREIGN PATENT DOCUMENTS

DE    102004039856 A1    3/2006
DE    102008036131 A1    3/2009
(Continued)

OTHER PUBLICATIONS

"Intelligent Transport Systems (ITS), Vehicular Communications, Basic Set of Applications, Definitions," ETSI Draft, ITSWG1-06D008 TR_102_638_Final_Draft_For_Comment_Resolution_and_Approbatio, European Telecommunications Standards Institute (ETSI), 650, Route des Lucioles, F-06921, Sophia-Antipolis; vol. 1.0.5, pp. 1-78, Apr. 15, 2009.
(Continued)

*Primary Examiner* — Jelani Smith
*Assistant Examiner* — Luis A Martinez Borrero
(74) *Attorney, Agent, or Firm* — Lempia Summerfield Katz LLC

(57) ABSTRACT

The invention relates to a method for communication on the basis of an, in particular wireless, motor vehicle communi-
(Continued)

cation system interacting in an ad-hoc manner, wherein the communication takes place between road users themselves and/or between road users and traffic infrastructure, in which, in the vicinity of a node for traffic routes, particularly junctions or intersections between traffic routes such as road or rail junctions, a radio transmission/radio reception device associated with a first road user continuously sends a message to at least one second radio transmission/radio reception device, which is situated in the radio coverage area of the first radio transmission/radio reception device and is associated with a device for the traffic infrastructure, the message is sent such that, on the basis of the received message, for each manoeuvre that is possible at the node, at least one value correlating to a probability of execution of the manoeuvre at the node is ascertained, and the road users are controlled on the basis of the correlating value. The invention also relates to a device for the traffic infrastructure and to a road user device having means for carrying out the method.

29 Claims, 2 Drawing Sheets

(51) Int. Cl.
*G06G 7/76* (2006.01)
*G08G 1/00* (2006.01)
*G08G 1/01* (2006.01)
*G08G 1/0967* (2006.01)
*G01S 19/13* (2010.01)
*H04W 84/18* (2009.01)

(52) U.S. Cl.
CPC ..... *G08G 1/0145* (2013.01); *G08G 1/096716* (2013.01); *G08G 1/096741* (2013.01); *G08G 1/096783* (2013.01); *G08G 1/096791* (2013.01); *H04W 84/18* (2013.01)

(58) Field of Classification Search
CPC ......... H04W 12/04; H04W 4/22; H04W 4/06; H04W 52/0261; H04W 52/282; H04W 56/002; H04W 72/1205; H04W 76/022; G08G 1/096827; G08G 1/164; G08G 1/166; G08G 1/093; G08G 1/144; G08G 1/143; G08G 1/056; G08G 1/167; G08G 1/096783; G08G 1/0112; G08G 1/09626; G08G 1/09623; H04L 63/04; H04L 5/0007; H04L 63/0272; H04L 63/0861; H04L 63/1433
USPC ..... 701/117, 2, 36, 118, 119, 120, 400, 468, 701/70, 532, 1, 26, 27, 300, 302, 423, 701/469; 370/312, 370, 336, 328, 216, 370/390, 432, 470
See application file for complete search history.

(56) References Cited

U.S. PATENT DOCUMENTS

| | | | | |
|---|---|---|---|---|
| 7,313,467 B2* | 12/2007 | Breed | ............... | G07C 5/008 307/9.1 |
| 7,979,198 B1* | 7/2011 | Kim | ............... | G08G 1/091 701/117 |
| 8,041,469 B2* | 10/2011 | Kellum | ............... | G01S 11/06 700/300 |
| 8,060,260 B2* | 11/2011 | Huang | ............... | B60W 30/12 340/439 |
| 8,520,695 B1* | 8/2013 | Rubin | ............... | G08G 9/02 370/337 |
| 8,710,978 B2* | 4/2014 | Stahlin | ............... | G08G 1/096783 340/539.1 |
| 8,717,192 B2* | 5/2014 | Durekovic | ............... | G08G 1/161 340/903 |
| 8,892,356 B1* | 11/2014 | Weiland | ............... | G01C 21/3658 340/995.1 |
| 9,253,753 B2* | 2/2016 | Rubin | ............... | H04W 72/005 |
| 2002/0029108 A1* | 3/2002 | Liu | ............... | G01C 21/26 701/410 |
| 2003/0063015 A1 | 4/2003 | Ebner et al. | | |
| 2004/0230370 A1* | 11/2004 | Tzamaloukas | ..... | G01C 21/3492 701/400 |
| 2004/0230373 A1* | 11/2004 | Tzamaloukas | ......... | G01C 21/28 701/468 |
| 2005/0137786 A1* | 6/2005 | Breed | ............... | B60N 2/2863 701/482 |
| 2007/0276600 A1* | 11/2007 | King | ............... | G08G 1/042 701/301 |
| 2008/0133136 A1* | 6/2008 | Breed | ............... | B60N 2/2863 701/301 |
| 2009/0309757 A1* | 12/2009 | Mudalige | ............... | G08G 1/161 340/905 |
| 2010/0019880 A1* | 1/2010 | Huang | ............... | G07C 5/085 340/5.1 |
| 2010/0023216 A1* | 1/2010 | Huang | ............... | B62D 6/007 701/42 |
| 2010/0245123 A1* | 9/2010 | Prasad | ............... | B60T 8/175 340/870.41 |
| 2010/0250106 A1* | 9/2010 | Bai | ............... | G08G 1/096716 701/117 |
| 2010/0303048 A1* | 12/2010 | Stahlin | ............... | H04W 84/12 370/338 |
| 2011/0093178 A1 | 4/2011 | Yamada et al. | | |
| 2011/0298603 A1* | 12/2011 | King | ............... | G08G 1/164 340/436 |
| 2012/0268293 A1* | 10/2012 | Stahlin | ............... | G08G 1/096783 340/901 |
| 2012/0290198 A1 | 11/2012 | Firl et al. | | |
| 2013/0116915 A1* | 5/2013 | Ferreira | ............... | G08G 1/163 701/117 |
| 2013/0304279 A1* | 11/2013 | Mudalige | ............... | G08G 1/164 701/2 |
| 2014/0126557 A1* | 5/2014 | Kasslatter | ............... | H04L 5/0091 370/336 |
| 2014/0278029 A1* | 9/2014 | Tonguz | ............... | G08G 1/087 701/117 |
| 2015/0262483 A1* | 9/2015 | Sugawara | ............... | G08G 1/0962 340/929 |
| 2016/0055745 A1* | 2/2016 | Karacan | ............... | H04W 4/028 701/117 |
| 2016/0203719 A1* | 7/2016 | Divekar | ............... | B60R 1/00 701/70 |
| 2017/0113665 A1* | 4/2017 | Mudalige | ............... | B60T 7/22 |

FOREIGN PATENT DOCUMENTS

| | | |
|---|---|---|
| DE | 102009008241 A1 | 8/2010 |
| DE | 102011101359 A1 | 11/2012 |
| EP | 1223567 A1 | 7/2002 |
| EP | 2306434 A1 | 4/2011 |
| WO | WO2009149730 A1 | 12/2009 |

OTHER PUBLICATIONS

Sepulcre, M., and J. Gozalvez. "On the importance of application requirements in cooperative vehicular communications." Wireless On-Demand Network Systems and Services (WONS), 2011 Eighth International Conference on. IEEE, 2011.
German Office Action for related German Application No. 10 2012 222 780.6, dated Sep. 25, 2013, with English Translation.
PCT International Search Report and Written Opinion of the International Searching Authority dated Apr. 24, 2014 for corresponding PCT/EP2013/073897.

(56) References Cited

OTHER PUBLICATIONS

European Grant Decision for related European Application No. 13 792 352.0, dated Jul. 7, 2017, with English Translation.

* cited by examiner

METHOD FOR COMMUNICATION WITHIN AN, IN PARTICULAR WIRELESS, MOTOR VEHICLE COMMUNICATION SYSTEM INTERACTING IN AN AD-HOC MANNER, DEVICE FOR THE TRAFFIC INFRASTRUCTURE AND ROAD USER DEVICE

This application is the National Stage of International Application No. PCT/EP2013/073897, filed Nov. 15, 2013, which claims the benefit of German Patent Application No. DE 10 2012 222 780.6, filed Dec. 11, 2012. The entire contents of these documents are hereby incorporated herein by reference.

BACKGROUND

The present embodiments relate to communication within a motor vehicle communication system interacting in an ad-hoc manner.

It is known that radio transmission/radio reception devices for communication within a motor vehicle communication system interacting in an ad-hoc, for example, wireless, manner, are in use for communication between road users among each other. "Interacting in an ad-hoc manner" may be ad-hoc networks (e.g., essentially self-organizing networks formed or operated spontaneously via direct communication of the network nodes involved). In road traffic, this communication may include motor vehicles. Therefore, the communication is referred to as "car to car" (C2C) communication. However, this communication also includes communication with the traffic infrastructure, which is formed, for example, by base stations formed by "roadside units" (RSUs) such as traffic lights, for conveying the communication or broadcasting information to information networks or traffic control centers connected to the traffic light. This is referred to as "car to infrastructure" (C2I) communication. Since road users may include not only vehicles, but also bicycles or bicyclists and pedestrians, this communication also includes the exchange of data between the radio transmission/radio reception devices operated by bicycles or bicyclists and pedestrians and the radio transmission/radio reception devices operated by motor vehicles. There is no term or acronym for bicycles or bicyclists and pedestrians, but bicycles or bicyclists and pedestrians fall under the familiar term for the generalization of this type of communication of "car to X" technology or communication (C2X).

This type of communication is to be distinguished from the known mobile radio communication, since the communication is generally carried out in an automated manner (e.g., predominantly without triggering or required actions by the user) and is used for the purpose of collecting and exchanging traffic-related data, so that it is possible to respond appropriately to all possible traffic situations (e.g., via warnings from the user or automatic responses from the motor vehicle).

For collecting and, for example, for exchanging data, it is known that every motor vehicle transmits a cyclical message that contains a vehicle ID and information about the speed, direction, and position at an interval of a few seconds.

It is known that controllers of intersections are, for example, implemented by RSUs, and the sequence and timing of traffic light cycles change as a function of information that comes from a plurality of sensors that are placed in the ground beneath the streets (e.g., per predefined lane). The information that is detected and reported includes, for example, the vehicle presence, the vehicle direction, and the vehicle speed on a multilane road.

A wide variety of sensors is used in order to enable a precise determination of the position and direction of vehicles that are traveling in a particular lane.

It is also known that the efficiency of the traffic control at an interchange such as a junction or crossing and the like is a function of how rapidly the interchange is traversed by vehicles. Generally, traffic light cycles (e.g., suitable intervals for a red, yellow, and green signal) may influence this. However, despite the use of a wide variety of sensors, the control is currently not optimal. Thus, traffic jams continue to occur.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the aforementioned problems of, for example, a motor vehicle communication system interacting in an ad-hoc manner are overcome.

In a method for communication based on a motor vehicle communication system (e.g., a wireless communication system) interacting in an ad-hoc manner, where the communication is carried out between road users among each other and/or between road users and traffic infrastructure, in a near field of an intersection of traffic routes (e.g., junctions or overlaps of road or rail crossings), a radio transmission/radio reception device associated with a first road user continuously transmits a message to at least one radio transmission/radio reception device associated with a device of the traffic infrastructure that is located in the radio coverage area of the first radio transmission/radio reception device. The transmission of the message is carried out such that, based on the received message, at least one value correlating with a probability for the execution of the maneuver at the intersection is ascertained per possible maneuver at the intersection, whereupon a control of the road user is carried out based on the correlating value.

The method according to one or more of the present embodiments makes it possible to carry out a more precise control of the traffic at such intersections, since by detecting and distinguishing the individual maneuvers per road user, a more detailed estimation may be carried out. Depending on the maneuver and number of road users who want to perform the maneuver, a delay having a varying length may occur, which may even result in gridlock. The present embodiments prevent this. The estimation and obtained data correlate with the size of the near field. Therefore, this size may be applied variably. In other words, a radius is defined as the basic size and is changed as required at a later time if an adjustment is necessary and required. However, the near field may also simply be defined by the radii of the radio coverage areas, the first and second radio transmission/radio reception devices involved, or the overlapping of these radio coverage areas required for communication.

If the correlating value for each first radio transmission/radio reception device is calculated as a first period of time, based on this refinement of one or more of the present embodiments, the control may thus be based on individual times that have been ascertained for the respective road user, or may be based on sums of the times, for example, grouped according to maneuver.

Alternatively or in addition, the correlating value for each possible maneuver is calculated as a linear measure based on a reference point (e.g., a stop line at the intersection). This makes it possible to transmit to the individual road users which "clearance zone" the individual road users are located in, via associated radio transmission/radio reception devices. In this case, each "clearance zone", for example, may indicate whether the completion of the maneuver may be carried out during the current green phase of a traffic light, or in subsequent phases.

In addition or alternatively, it is also advantageous if a second time period is ascertained as a correlating value per maneuver. The correlating value per maneuver is defined such that the correlating value per maneuver determines the interval per possible maneuver with which a phase of the execution of determined maneuver begins. This also makes it possible for the controller to provide a road user with an estimation of the future development of the execution phases, and thus to take account of different utilization phases such as during peak traffic times or at night, but also to carry out and communicate shorter-term interval adjustments due to current developments.

In one embodiment, the first and/or second time period and/or the linear measure are transmitted as an integer value "integer." This allows direct computational use. The linear measure may be defined as part of a set of variables (e.g., "length"). Likewise, the interval may be defined as part of this set (e.g., "interval").

A U-turn, driving straight ahead, turning left and/or right, changing lanes, or the like may be defined as possible maneuvers. This makes it possible to determine the common road traffic maneuvers. Increasing the differentiation with which the maneuvers are detected makes it possible to ascertain a correlating value more precisely. For example, when turning left/right, it is possible to distinguish more precisely between a sharp left turn or a left half-turn. Other classes of maneuvers may also be provided and are to be included.

In one embodiment, the possible maneuver is transmitted as a character string "string" and may be part of the set of variables, where the possible maneuver may be referred as a "maneuver." Alternatively, the maneuver may be characterized by an identification number (e.g., defined as an "integer"). Here as well, machine- or computer-based processing is supported. Thus, the implementation of the method is also supported.

If the control is carried out such that second messages that include at least the correlating value are transmitted to the first radio transmission/radio reception devices, the value may thus be displayed, directly or after local processing, to the road user having the first radio transmission/radio reception device, for example, in connection with the display of alternative maneuvers. The road user is thus provided with an opportunity to respond flexibly to the situations.

If, alternatively or in addition, the control is carried out such that the second message affects the first road users such that a stop ahead of a stop line of the intersection (e.g., defined per maneuver) is forced, it may be possible to prevent gridlock, since a zone is thus virtually created in which collisions with other road users in other phases of the use of the intersection is generated and kept free. For example, following a green phase, the pedestrians, cyclists, or vehicles of a crossing street may use their lanes or walking paths unimpeded during the green phase, and hazards as well as additional gridlock are thus avoided.

For influencing (e.g., using the second message), a data transmission of a control signal designed as a "Boolean" logical value may be carried out. This may also be part of the data set (e.g., the "waitOn-Stopline").

If the control of the road users is carried out such that information from signal providers (e.g., electronic signs, traffic lights, and traffic management systems) is changed based on the first correlation, the traffic situation may thus be directly influenced at the location of the occurrence.

In one embodiment, the first message is at least temporarily periodically transmitted repeatedly in the near field (e.g., the radio transmission/radio coverage area of the device of the traffic infrastructure), as this makes it possible to provide that the first message is highly up-to-date.

In one embodiment, the duration of the period is established, so that the algorithm implemented according to one or more of the present embodiments provides the same results everywhere. A value of approximately 100 ms is generally highly suitable for evaluation and reliability.

In one embodiment, the first message contains a first piece of information depicting the intended maneuver, direction of travel, position, dimension, type, and/or speed of the first road user. This makes it possible to ascertain the correlating value highly accurately.

If the message is transmitted such that the message contains a piece of information depicting the intended maneuver, the direction of travel, position, dimension, type, and/or speed of the first road user (e.g., of the vehicle), the correlating value may be ascertained precisely.

If the transmitted position is ascertained based on a satellite-supported navigation system such as GPS, Galileo, and/or other national and international navigation satellite systems for position determination, an economical system that is also widespread due to the market penetration of navigation devices is available which.

One or more of the present embodiments may also be refined such that the radio transmission/radio reception devices for data transmission are operated according to a dedicated short-range radio communication standard (e.g., the Dedicated Short Range Communication, "DSRC"). Such short-range radio communication standards are suitable for communication between vehicles and other mobile road users and provide, via the standardization, that the interaction also functions. For example, integrated with the WLAN Standard 802.11 and derivatives thereof such as 802.11a/b/e/g/n/p, this functions very well.

If the radio transmission/radio reception devices according to one or more of the present embodiments are to be operated in the U.S., it is advantageous if the radio transmission/radio reception devices are operated for data transmission according to the Wireless Access in Vehicular Environments (WAVE) standard, or derivatives thereof.

A defined radio interface of the radio transmission/radio reception devices is obtained if the radio transmission/radio reception devices for data transmission are operated at least partially according to the IEEE 1609 standard and/or ETSI Intelligent Transportation Systems (ITS) or derivatives thereof.

The refinement in which the radio transmission/radio reception devices are operated for data transmission (e.g., communication), at least partially according to the IEEE 802.11 or derivatives thereof (e.g., IEEE 802.11p), brings broad distribution and penetration, since, by now, every portable communication device (e.g., cell phones and PDAs) has such a WLAN interface. These devices may thus be used for traffic-related communication among road users without large modifications. The refinement using the IEEE 802.11p derivative is highly reliable in rapidly moving objects such as motorized vehicles.

In one embodiment, the radio transmission/radio reception devices carry out, or the associated method carries out, the communication with road users at least partially according to a mobile radio standard such as GSM, UMTS, LTE, or derivatives thereof. This is advantageous for better penetration and detection, since pedestrians and cyclists who are in possession of a mobile telephone device (e.g., cell phones), as already indicated, may also be integrated into the communication. Therefore, a more comprehensive overall picture of the traffic may be formed.

Further penetration is achieved if the radio transmission/radio reception devices are refined such that the radio transmission/radio reception devices are operated for communication with road users at least partially according to the European ETSI TC ITS standard, the American Vehicle Safety Communications (VSC) program, its successor, the Connected Vehicle Communications program, or the Japanese Advanced Vehicle Safety (AVS) program. This makes it possible to use the device according to one or more of the present embodiments in various parts of the world.

This is advantageously supplemented by, or the alternative is also recommended of, refining the radio transmission/radio reception devices used according to the present method such that the radio transmission/radio reception devices are operated for communication with road users at least partially according to the ISO Continuous-Air Long and Medium Range (CALM) standard. Thus, the device is usable worldwide without any changes or national adaptations, which is appropriate for the notion of vehicle mobility.

One or more of the present embodiments also relate to a device of the traffic infrastructure for communication based on, for example, a wireless motor vehicle communication system interacting in an ad-hoc manner. The communication is carried out between road users among themselves and/or between road users and traffic infrastructure. The device includes a second radio transmission/radio reception device for receiving at least a first message transmitted by a first radio transmission/radio reception device associated with a first road user. The device also includes a controller for ascertaining, per possible maneuver at the intersection, at least one value correlating with a probability for the execution of the maneuver at the intersection, based on the received message. The controller also controls the road users based on the correlating value, and is configured for forming a second message. The controller is also configured to transmit the second message to the first radio transmission/radio reception device via the second radio transmission/radio reception devices.

One or more of the present embodiments also relate to a road user device for communication based on a motor vehicle communication system (e.g., a wireless motor vehicle communication system) interacting in an ad-hoc manner. The communication is carried out between road users among each other and/or between road users and the traffic infrastructure. The road user device is configured to transmit at least a first message, using a first radio transmission/radio reception device associated with the road user device, to a second radio transmission/radio reception device associated with a second road user or with a device of the traffic infrastructure that is located in the radio coverage area of the first radio transmission/radio reception device. The transmission of the first message is carried out such that, based on the received first message, a first direction of a change in position of the first road user is ascertained. The road user device is configured for receiving a second message transmitted in the case of a control, and is configured to carry out a procedure related to the control.

These apparatuses according to one or more of the present embodiments allow the implementation of the method, thus increasing the exploitation of the advantages of the method for the benefit of traffic safety.

Refinements of these arrangements result "mutatis mutandis" from the refinements of the method, thus also having "mutatis mutandis" the same advantages as the corresponding refinements of the method, in each case with the additional advantage contributed to the realization of the advantage of the subject matter.

DETAILED DESCRIPTION

Figure 1:
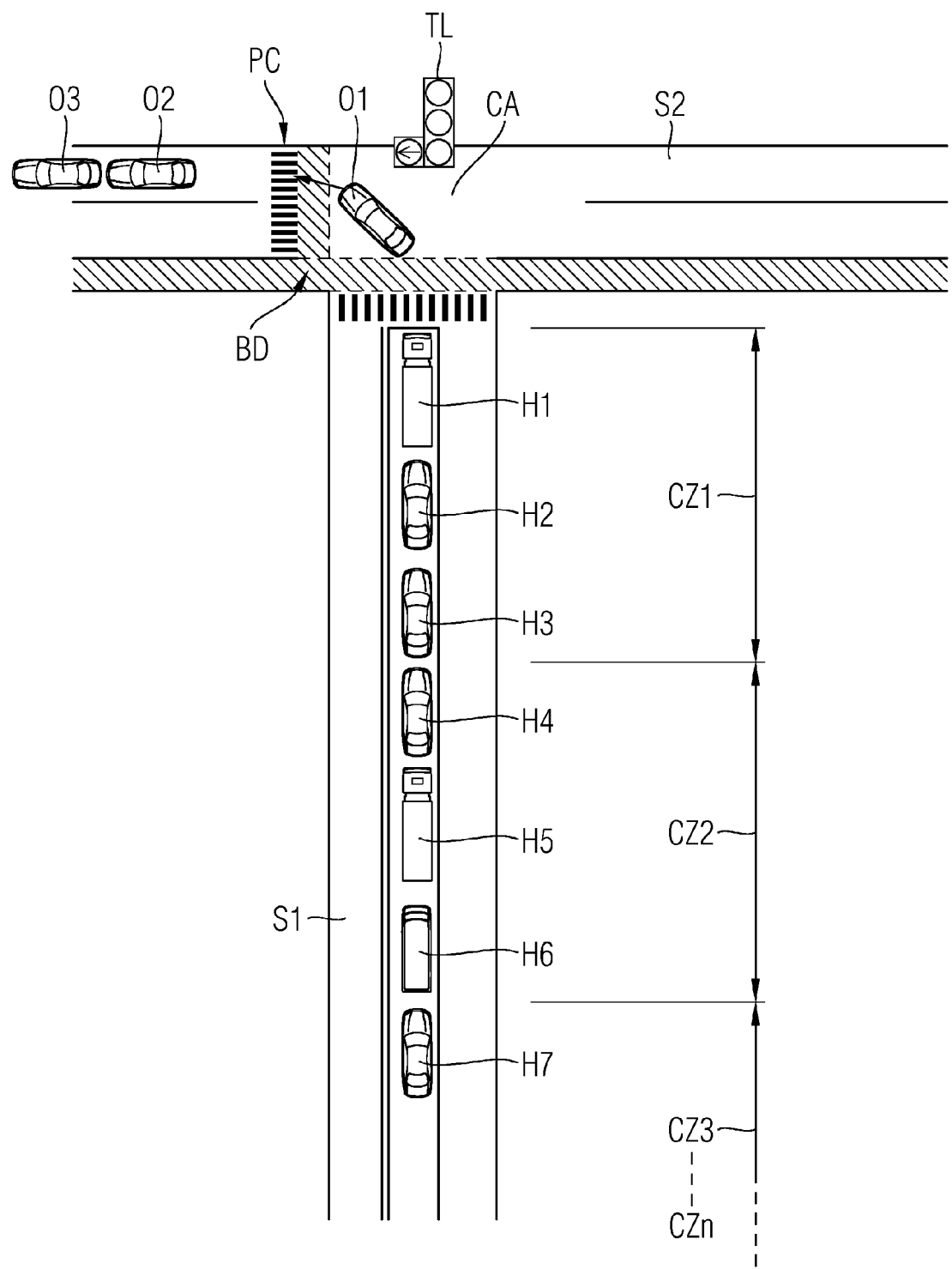
FIG. 1 schematically depicts an exemplary situation of road users in a mobile ad-hoc network at a junction, during an unblocked turning maneuver.

FIG. 1 depicts a scenario, based on which an embodiment is depicted.

Vehicles H1 . . . H7 are lined up on a first street S1 and are waiting to perform a left-turn maneuver. A vehicle O1 that has not yet completed a left-turn maneuver and vehicles O2 . . . O3 located on a second street S2 crossing the first street S1 are shown. The vehicles O2 . . . O3 are far enough away from the crosswalk PC, which is depicted as zebra stripes, that the first turning vehicle is not impeded in a turning maneuver of the first turning vehicle. Thus, the vehicles O2 . . . O3 would not impede a completion of the turning maneuver.

Due to the left-turn maneuver that has not been fully completed, the first vehicle O1 is located within the danger zone (e.g., a conflict area CA), which, according to the exemplary embodiment, is monitored by devices of the traffic infrastructure such that it is ascertained whether vehicles stop within this zone (e.g., the location, which is determined as accurately as possible, and the orientation of the respective vehicle).

This makes it possible to implement the approach according to one or more of the present embodiments of optimizing the traffic flow. This, for example, affects the information supply of drivers or vehicles driven by the drivers that are waiting at an interchange (e.g., a crossing or junction) for the opportunity to carry out a maneuver (e.g., driving straight ahead or turning left or right). According to one or more of the present embodiments, the communication system used at such traffic crossings known as vehicle-to-X-communication (e.g., vehicle-to-roadside, roadside-to-vehicle, V2X), which constitutes a cooperative system of the involved traffic devices, is improved.

Cooperative communication is carried out in this environment essentially between vehicles that are equipped with a corresponding radio transmission/radio reception device, which is also referred to as an on-board unit (OBU), and devices of the traffic infrastructure, such as, for example, traffic lights, traffic management systems, signs, or other rather static devices along a traffic route (e.g., roadside units (RSUs)).

In addition to safety aspects, these devices also exchange information with respect to an optimization of the traffic flow. One or more of the present embodiments intervene such that, based on this communication, a traffic control that is configured to ascertain the traffic flow (e.g., for each maneuver that occurs at the junction) and inform the driver (e.g., by transmission to the OBU) of how the time period required for crossing the junction is estimated at the current point in time is carried out.

According to the exemplary embodiment, an indication of the probability with which the maneuver intended to be made during the next green phase of the traffic lights, or one of the subsequent green phases may be carried out is also provided to the vehicles H1 . . . H7 waiting, for example, for a left turn, or to the driver. This may, for example, be carried out during a red phase, so that the driver is not distracted and receives and/or is able to retrieve this information while the driver is not driving.

In this way, the driver may direct his/her full attention to the transition from the red phase of the traffic light to the green phase of the traffic light and carry out his/her planned maneuver as rapidly as possible. This will, for example, be carried out as rapidly as possible if the vehicle stops in the first clearance zone CZ1.

Exemplary embodiments of the procedures used for this or facilitating this are described in greater detail below.

The traffic controller detects the flow of the vehicles traveling in the area of a traffic intersection to be controlled (e.g., a junction), in that the vehicles periodically transmit their status to the traffic infrastructure (e.g., the traffic controller) at intervals of 100 ms. This status may be the position, direction of travel, vehicle size, and the like. The traffic controller thus has detailed information, from which the exact position and movement of the vehicles (e.g., also the lanes that the vehicles take, or select and leave again) in the vicinity of the junction may be determined. As a result, the traffic controller, for example, also has knowledge about the exact vehicle positions and directions of movement of the vehicles within the collision area CA.

The traffic controller constantly follows the transmitted data, so that the information is continually updated.

In FIG. 1, the vehicles H1 . . . H7 are waiting vehicles that are waiting for the opportunity to turn left into the crossing street S2. The vehicles H1 . . . H7 are thus dependent on the signal of the traffic light TL and their own current position, as well as the position (and other variables such as dimension, direction of movement) of the other vehicles.

In FIG. 1, the first vehicle O1 is currently completing the left-turn maneuver, and the second vehicles O2 . . . O3 have already completed this maneuver.

In order to ascertain a period of time, the traffic controller according to the exemplary embodiment evaluates the knowledge about the movement of the vehicles in the lanes, and based on dimension and knowledge, which and how many vehicles want to carry out which maneuvers (e.g., pass through the junction). Since this takes place continuously, each current time indication will vary according to the external circumstances such as the high volume of traffic at rush hour, or quieter phases, for example, at night.

By ascertaining the period of time and estimating how many vehicles are able to pass through the junction by carrying out the desired maneuver (e.g., turning left or right), the traffic controller calculates the length of the "clearance zones" CZ1 . . . 3.

The division of the zones CZ1 . . . 3 and ascertainment of their dimensions (e.g., length) is carried out, for example, such that each zone represents the green phase in which each vehicle of the waiting vehicles H1 . . . 7 that is located in the zones CZ1 . . . 3 will likely have completed its maneuver.

The length of the first zone CZ1, which represents the zone having the highest probability of completing the left-turn maneuver during the next green phase of the traffic light TL, extends, for example, from a stop line for left-turning vehicles to the second zone CZ2.

For performing calculations, according to the exemplary embodiment, the following parameters may be used individually or in combination: a count of how many vehicles passed through the junction during the last green phase of the traffic light TL; a calculation of an average vehicle length based on the data transmitted by the vehicles; an ascertainment of the average number of vehicles counted that pass through the junction (e.g., over a certain period of time such as 10 minutes); mathematical link of the average number with the average length of the vehicles for ascertaining the length or length.

Following the calculation, the respective current value of the length of the respective clearance zone (e.g., the anticipated green phase up to the completion of the left-turn maneuver (or right-turn maneuver or another maneuver, depending on the type of intersection)) is transmitted to the still-waiting vehicles H1 . . . 7.

In addition, the waiting vehicles H1 . . . H7 are informed of the time interval between each start of a possible maneuver or each green phase.

Based on these transmitted data, the individual waiting vehicles H1 . . . H7 may individually determine the period of time in which the planned maneuver will likely be carried out. In addition to the aforementioned transferred data, the individual waiting vehicles H1 . . . H7 may also use their own position, which, for example, is autonomously ascertained with satellite or mobile radio support.

Following this, each vehicle of the waiting vehicles H1 . . . 7 is then able to provide the driver of the vehicle with information about the planned maneuver (e.g., waiting time), so that the driver is able to opt for alternatives to the maneuver that are possibly known to the driver or are based on the driver's navigation system.

Figure 2:
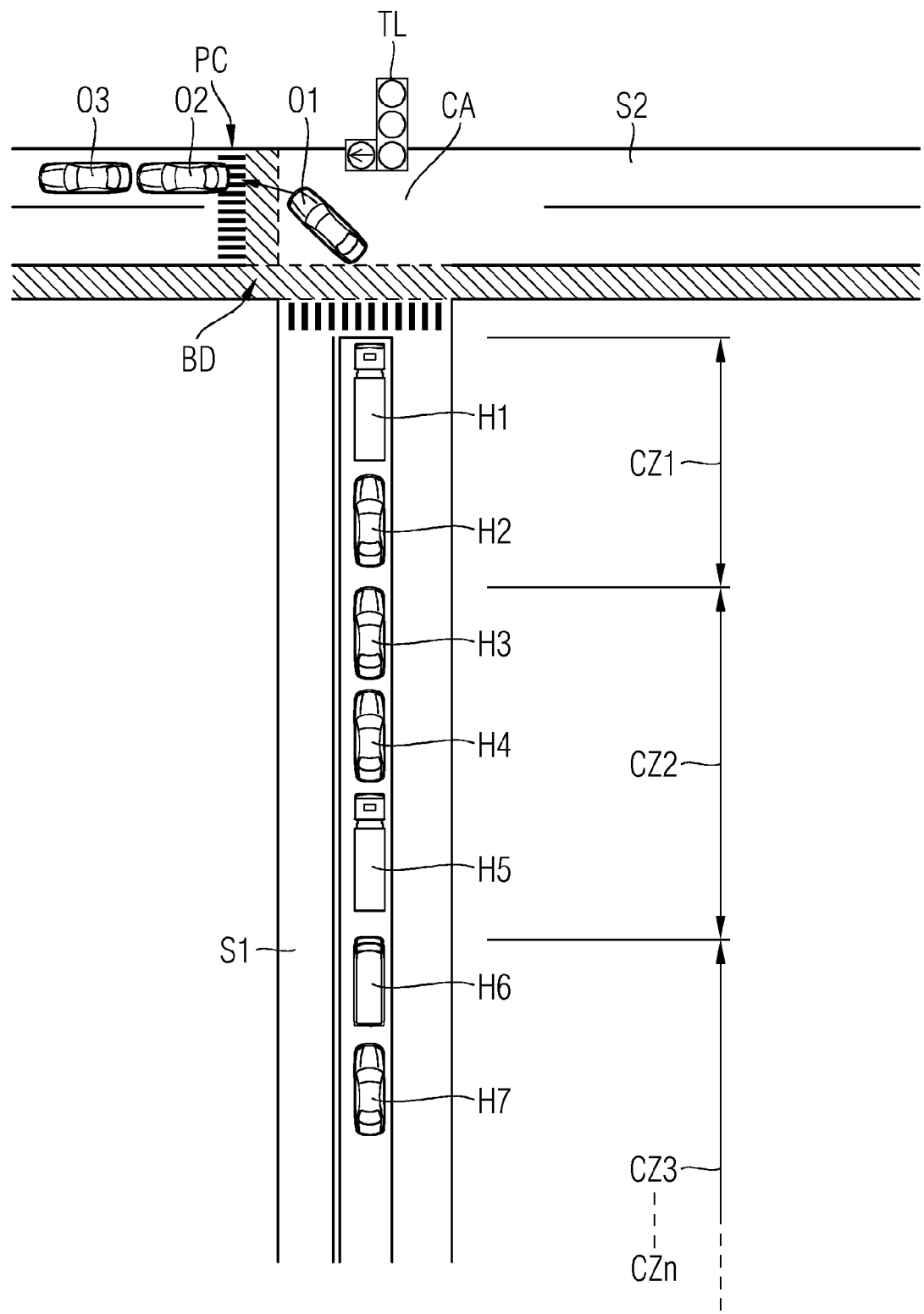
FIG. 2 schematically depicts an exemplary situation of road users in a mobile ad-hoc network at a junction, during a blocked turning maneuver.

FIG. 2 depicts a scenario that is similar to the exemplary embodiment from FIG. 1 with respect to the involved entities, so that the description is the same. However, in the variant according to FIG. 2, the traffic light TL interacts with the traffic controller such that the traffic light TL influences the traffic regulation or the traffic flow.

By way of explanation, the second vehicles O2 . . . O3 in FIG. 2 are in a position in which the second vehicles O2 . . . O3 impede the completion of the turn maneuver by the first vehicle O1.

The influence according to the variant is carried in that the utilization of the lanes (e.g., the left-turn lane) is observed, and the observation is reported to the traffic controller, so that the traffic controller may give the following instructions regulating the traffic to the vehicles (e.g., to the waiting vehicles H1 . . . H7) as a function of this utilization. If vehicles such as the first waiting vehicle H1 are located in the foremost position for turning (e.g., as shown in FIG. 1, behind the stop line for turning left), the first waiting vehicle H1 is instructed to remain behind the stop line as long as the first turning vehicle O1 is located in the collision area CA, or the target lane has capacity to accommodate the first waiting vehicle H1. This instruction keeps both the pedestrian crossings PC and the bike path BD free. This is advantageous if the first waiting vehicle H1 was not able to turn and the traffic light TL has changed to red in the meantime, so that the first waiting vehicle H1 would continue to block these lanes. The traffic controller may then take such cases as a trigger for updating the probabilities or estimated times for completion of the turn maneuver. In the example of the non-free collision area CA provided, this may result in a reduction of the probability of turning and correspondingly shorten the dynamically ascertained lengths of the "clearance zones" CZ1 . . . CZn (e.g., the first CZ1) and move up the following "clearance zones" CZ2, CZ3, . . . , CZn with respect to the linear measure to the stop line. The third waiting vehicle H3, for example, thus falls into a second "clearance zone" CZ2 and as a result, may be able to carry out the intended maneuver only during the next green phase.

The instructions according to the case depicted in FIG. 2, as well as for the transmissions of the messages described in FIG. 1, may be carried out using a mobile radio communication standard such as GSM, UMTS, LTE, or derivatives thereof. For example, a mobile radio device of the vehicle driver that is capable of doing this, which is connected by wire to the vehicle control device or connected wirelessly via a short-range standard (e.g., Bluetooth, Near Field Communication, or the like) may be used. This is useful, for example, in a traffic communication system, in which the pedestrians and cyclists are also to be integrated into the control via mobile radio devices of the pedestrians and cyclists, respectively. Depending on whether the pedestrians and cyclists are now driving a vehicle (which is correspondingly detected), or will be leaving the vehicle, the pedestrians and cyclists are classified and included by the system as corresponding road users.

Alternatively or in addition, the communication by the traffic controller and the vehicle is implemented according to individual radio communication standards or combinations thereof, depending on the place or type of use. The radio communication standards may, for example, be Dedicated Short Range Communication (DSRC), the Wireless Access in Vehicular Environments (WAVE) standard or derivatives, IEEE 1609 and/or ETSI Intelligent Transportation Systems, ITS or its derivatives, IEEE 802.11 or derivatives thereof (e.g., IEEE 802.11p).

Combinations of the standards may, for example, be provided if control messages are to be transmitted on different paths than the messages periodically sent by the vehicles, in order to minimize a collision with data to be transmitted or to optimize the resource utilization. It may be advantageous to transmit messages directly to the terminals and to use radio standards of the terminals in order, for example, to send time-critical messages such as warnings rapidly.

The advantages of one or more of the present embodiments that are demonstrated based on the example or by the depicted scenarios lie in a higher efficiency of the clearance intervals during maneuvers in or at an interchange such as a crossing, a junction, or the like.

In addition, the vehicle driver or road user is extensively informed about the waiting times of specific maneuvers at traffic lights.

This knowledge also allows the driver to be free and able to initiate alternatives to his/her planned maneuver in a timely manner.

Traffic jams and gridlock at intersections are avoided or resolved. The present embodiments are not limited to the depicted scenario. One or more of the present embodiments may thus also be used, for example, in controlling trains, or also for controllers of vehicles by sea or in the air, where identical or comparable situations occur or the advantageous effects of the present embodiments bring the same or comparable improvements in traffic.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for communication based on a motor vehicle communication system interacting in an ad-hoc manner, wherein the communication is carried out between road users among each other, between road users and a traffic infrastructure, or a combination thereof, the method comprising:
continuously transmitting, by a first radio transmission/radio reception device associated with a first road user, in a near field of an intersection of traffic routes a first message to at least one radio transmission/radio reception device associated with a device of the traffic infrastructure, located in a radio coverage area of the first radio transmission/radio reception device, the transmission of the first message being carried out such that, based on the received first message, at least one value correlating with a probability for execution of a maneuver at the intersection is ascertained per possible maneuver at the intersection, the first message including an estimated period of time before completing each possible maneuver; and
controlling the first road user based on the at least one correlating value.

2. The method of claim 1, wherein the at least one correlating value for each first radio transmission/radio reception device is calculated as a first period of time for carrying out the maneuver.

3. The method of claim 1, wherein the correlating value for each possible maneuver is calculated as a linear measure based on a reference point.

4. The method of claim 2, further comprising ascertaining a second time period as a correlating value per maneuver that is defined such that the second time period determines the interval per possible maneuver with which a phase of the execution of determined maneuver begins.

5. The method of claim 4, wherein the first period of time, the second time period, a linear measure, or any combination thereof is transmitted as an integer value "integer".

6. The method of claim 1, wherein a U-turn, driving straight ahead, turning left, turning right, and changing lanes are defined as possible maneuvers.

7. The method claim of claim 1, wherein the possible maneuver is transmitted as a character string "string" or via an identification number.

8. The method of claim 1, wherein the controlling comprises controlling such that second messages are transmitted to the first radio transmission/radio reception devices that include at least the at least one correlating value.

9. The method of claim 8, wherein the controlling comprises controlling such that the second message affects the first road users such that a stop ahead of a stop line of the intersection defined per maneuver is forced.

10. The method of claim 9, further comprising transmitting a control signal configured as a "Boolean" logical value for influencing using the second message.

11. The method of claim 1, wherein controlling the road user comprises controlling the road user such that information from signal providers is changed based on the correlation.

12. The method of claim 1, wherein the first message is at least temporarily periodically transmitted repeatedly in a radio transmission/radio coverage area of the device of the traffic infrastructure.

13. The method of claim 2, wherein a duration of the first period of time is established is 100 milliseconds.

14. The method of claim 1, wherein continuously transmitting the first message comprises continuously transmitting the first message such that the first message contains a piece of information depicting the intended maneuver, a direction of travel of the first road user, a position of the first road user, a dimension of the first road user, a type of the first road user, a speed of the first road user, or any combination thereof, the first road user comprising the motor vehicle.

15. The method of claim 14, wherein continuously transmitting the first message comprises continuously transmitting the first message such that the first message contains the position of the first road user, and
wherein the transmitted position is ascertained based on a satellite-supported navigation system, the satellite-supported navigation system comprising GPS, Galileo, other national and international navigation satellite systems for position determination, or any combination thereof.

16. The method of claim 1, wherein the communication is carried out according to a dedicated short-range radio communication standard.

17. The method of claim 1, wherein the communication is carried out according to the Wireless Access in Vehicular Environments (WAVE) standard, or derivatives thereof.

18. The method of claim 1, wherein the communication is carried out at least partially according to the IEEE 1609 standard, ETSI Intelligent Transportation Systems (ITS) or derivatives thereof, or a combination thereof.

19. The method of claim 1, wherein the communication is carried out at least partially according to the IEEE 802.11 standard or derivatives thereof.

20. The method of claim 1, wherein the communication with road users is carried out at least partially according to a mobile radio standard, the mobile radio standard comprising GSM, UMTS, LTE, or derivatives thereof.

21. The method of claim 1, wherein the communication with road users is carried out at least partially according to the European ETSI TC ITS standard, the American Vehicle Safety Communications (VSC) program, a successor to the VSC program, the Connected Vehicle Communications program, or the Japanese Advanced Vehicle Safety (AVS) program.

22. The method of claim 1, wherein the communication with road users is carried out at least partially according to the ISO Continuous-Air Long and Medium Range (CALM) standard.

23. A device of a traffic infrastructure for communication based on a motor vehicle communication system interacting in an ad-hoc manner, wherein the communication is carried out between road users among each other, between road users and the traffic infrastructure, or a combination thereof, the device comprising:
a radio transmission/radio reception device operable to receive at least a first message transmitted by another radio transmission/radio reception device associated with a first road user,
wherein the radio transmission/radio reception device is configured to:
ascertain, per possible maneuver at intersection, at least one value correlating with a probability for execution of the maneuver at the intersection based on the received first message, the first message including an estimated period of time before completing each possible maneuver;
control the first road user based on the correlating value;
form a second message; and
transmit the second message to the other radio transmission/radio reception device.

24. A road user device for communication based on a motor vehicle communication system interacting in an ad-hoc manner, wherein the communication is carried out between road users among each other, between road users and traffic infrastructure, or a combination thereof, the road user device comprising:
a first radio transmission/radio reception device configured to:
transmit at least a first message to a second radio transmission/radio reception device, the second radio transmission/radio reception device being associated with a device of the traffic infrastructure that is located in a radio coverage area of the first radio transmission/radio reception device, the transmission of the first message being carried out such that, based on the received first message at the second radio transmission/radio reception device, a first direction of a change in position of the road user is ascertained, the first message including an estimated period of time before completing each possible maneuver;
receive a second message transmitted in the case of a control; and
carry out a procedure related to the control.

25. The method of claim 1, wherein the intersection of traffic routes comprises junctions or overlaps of traffic routes, the junctions or overlaps of traffic routes comprising road or rail crossings.

26. The method of claim 3, wherein the reference point is a stop line at the intersection.

27. The method of claim 11, wherein the information from signal providers comprises electronic signs, traffic lights, and traffic management systems.

28. The method of claim 14, wherein the piece of information depicts the intended maneuver.

29. The method of claim 1, wherein controlling further comprises controlling the first road user based on the estimated period of time.

* * * * *